United States Patent [19]

Stafford

[11] 4,106,586

[45] Aug. 15, 1978

[54] HYDRAULIC VIBRATOR

[75] Inventor: Jay H. Stafford, Ponca City, Okla.

[73] Assignee: Continental Oil Company, Ponca City, Okla.

[21] Appl. No.: 803,465

[22] Filed: Jun. 6, 1977

[51] Int. Cl.² ............... G01V 1/14; G01V 1/04
[52] U.S. Cl. ..................... 181/121; 73/665; 92/13.6
[58] Field of Search .............. 181/113, 121; 73/662, 73/665; 91/166; 92/13.1, 13.5, 13.6

[56] References Cited

U.S. PATENT DOCUMENTS

| 356,538 | 1/1887 | Hubner | 92/13.6 |
|---|---|---|---|
| 2,478,790 | 8/1949 | Stephens | 92/13.1 |
| 2,596,471 | 5/1952 | Densmore et al. | 92/13.1 |
| 3,287,696 | 11/1966 | Cholet et al. | 181/121 |
| 3,731,592 | 5/1973 | Kreiskorte | 92/13.6 |
| 3,866,709 | 2/1975 | Mifsud | 340/17 |
| 4,046,623 | 9/1977 | Schmid | 92/13.1 |

*Primary Examiner*—Nelson Moskowitz
*Attorney, Agent, or Firm*—William J. Miller

[57] ABSTRACT

The present invention relates to an improved hydraulic vibrator of the type which includes a fixed double rod piston and a reaction mass reciprocally disposed around the piston forming a hydraulic cylinder therein so that when hydraulic fluid is introduced to the cylinder relative to the piston the reaction mass is reciprocated. By the present invention a pair of sleeves are slidably disposed on the piston rods, portions of which can be selectively moved into the cylinder to decrease the displacement of the cylinder and thereby increase the frequency range of vibrations producible by the vibrator.

8 Claims, 3 Drawing Figures

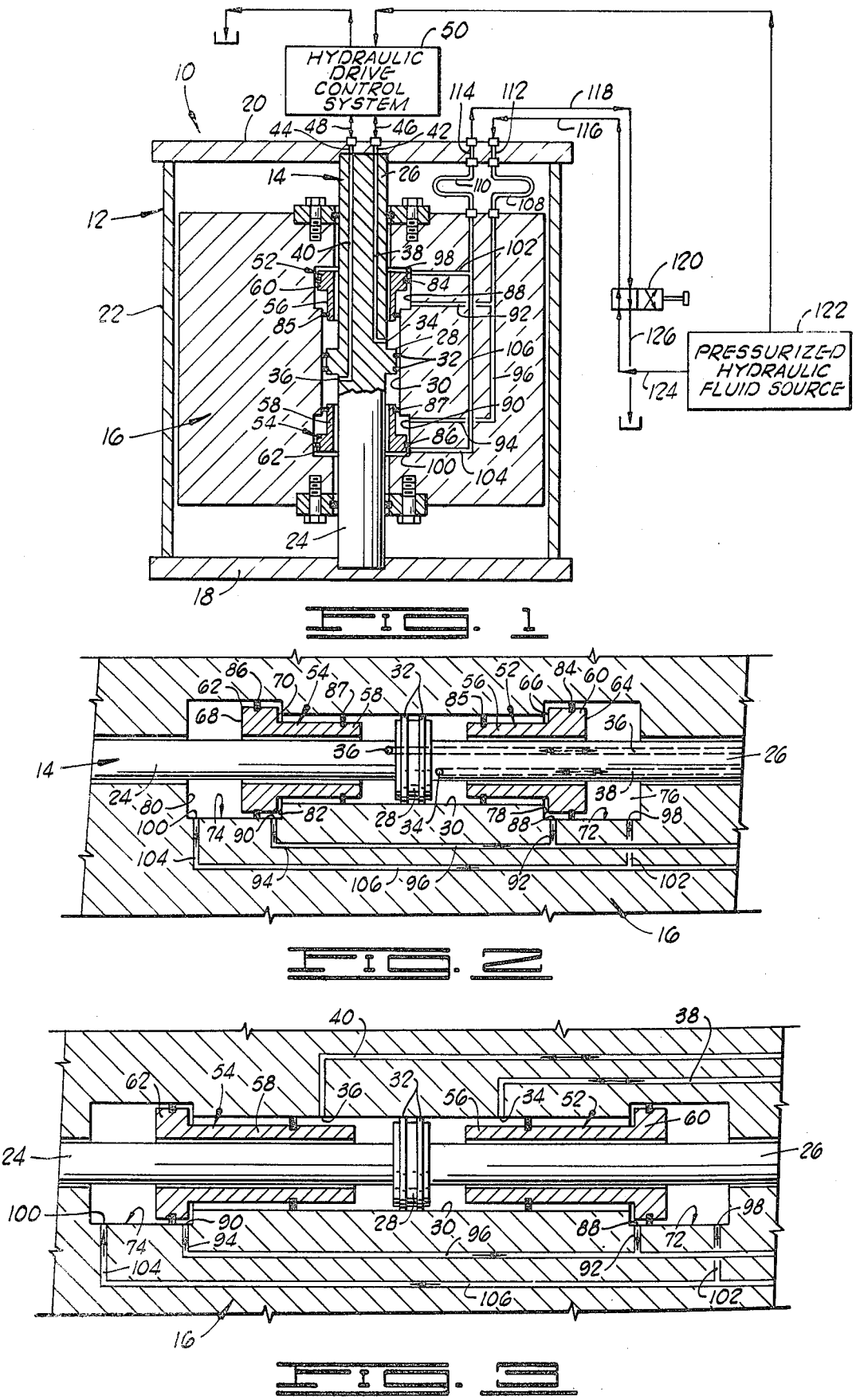

HYDRAULIC VIBRATOR

BACKGROUND OF THE INVENTION

1. Field of the Invention

The present invention relates to the art of seismographic surveying, and more particularly, but not by way of limitation, to an improved hydraulic vibrator of the type used to generate continuous seismic signals.

2. Description of the Prior Art

Many seismic surveying systems have been developed which utilize continuous wave seismic signals generated in the earth by one or more vibrators. While a variety of vibrators have been developed and used heretofore, they generally comprise a base plate for engaging the surface of the earth, a reaction mass and a linear actuator, usually hydraulic, for reciprocating the reaction mass relative to the base plate at a desired frequency. A particularly satisfactory hydraulic vibrator which has heretofore been developed and used utilizes a fixed vertical double rod piston member and a reaction mass reciprocally disposed around the piston member forming a hydraulic cylinder. Pressurized hydraulic fluid is introduced to the cylinder to reciprocate the reaction mass by a conventional hydraulic fluid control system which alternately ports hydraulic fluid to the two sides of the piston.

While the sizes of the pistons and displacements of the hydraulic cylinders of such vibrators have heretofore been designed to achieve maximum vibration frequency range, such frequency range is often inadequate requiring the use of two or more vibrators of differing design. That is, in order to produce low frequency vibrations, a vibrator having a hydraulic cylinder of relatively large displacement and which moves relatively large volumes of hydraulic fluid in and out of the hydraulic cylinder is required. The same vibrator is usually incapable of achieving the high frequency vibrations required in some seismic surveys in that the displacement of the hydraulic cylinder is such that it is physically impossible to move the large volumes of hydraulic fluid in and out of the cylinder at such high frequency.

By the present invention an improved hydraulic vibrator is provided which includes apparatus for selectively changing the displacement of the hydraulic cylinder thereby allowing the vibrator to be operated over a broader frequency range.

SUMMARY OF THE INVENTION

The present invention relates to an improved hydraulic vibrator having a piston member comprised of a pair of oppositely extending rods connected to a centrally disposed piston and a reaction mass reciprocally disposed around the piston member forming a hydraulic cylinder therein so that when hydraulic fluid is introduced to the cylinder relative to the piston the reaction mass is reciprocated. Sleeves are slidably disposed on the rods of the piston member, each of which includes a cylindrical portion of reduced diameter at the inner end thereof adjacent the piston and a cylindrical portion of enlarged diameter at the outer end thereof forming inner and outer oppositely facing annular surfaces thereon. The reaction mass includes a pair of enlarged cylindrical recesses positioned at opposite ends of the cylinder for containing the enlarged cylindrical portions of the sleeves. Each of the recesses terminates in inner and outer annular surfaces for coacting with the inner and outer annular surfaces of the enlarged portions of the sleeves thereby confining the longitudinal movement of the sleeves. The longitudinal lengths of the recesses are such that when the outer annular surfaces of the enlarged portions of the sleeves are in contact with the outer annular surfaces of the recesses, the reduced diameter portions of the sleeves lie substantially outside the cylinder, and when the inner annular surfaces of the enlarged portions of the sleeves contact the inner annular surfaces of the recesses, the reduced diameter portions of the sleeves are extended within the cylinder thereby reducing the displacement of the cylinder. Slidable seal means are attached to the enlarged portions of the sleeves for providing seals between the enlarged portions and the peripheral surfaces of the recesses, and means including ports for introducing hydraulic fluid into the recesses on selected sides of the slidable seal means are provided connected to the recesses and to a source of pressurized hydraulic fluid so that the sleeves can be simultaneously selectively moved between positions whereby the portions of reduced diameter thereof lie substantially outside the drive cylinder and positions whereby the portions of reduced diameter extend within the drive cylinder thereby reducing the displacement thereof.

It is, therefore, a general object of the present invention to provide an improved hydraulic vibrator.

A further object of the present invention is the provision of an improved hydraulic seismic vibrator capable of producing vibrations over a broad frequency range.

A further object of the present invention is the provision of an improved hydraulic vibrator of the type having a fixed piston member and a reaction mass reciprocally disposed around the piston member forming a hydraulic drive cylinder therein whereby the displacement of the hydraulic drive cylinder can be selectively changed to thereby allow the vibrator to be operated at both very low and very high frequencies.

Other and further objects, features and advantages of the present invention will be readily apparent from the following description of preferred embodiments when taken in conjunction with the accompanying drawings.

BRIEF DESCRIPTION OF THE DRAWINGS

FIG. 1 is a side sectional view partially in diagrammatic form of one form of the improved hydraulic vibrator of the present invention.

FIG. 2 is an enlarged partial view of the apparatus of FIG. 1 taken in cross section.

FIG. 3 is an enlarged partial sectional view similar to FIG. 2 but illustrating an alternate form of vibrator including the present invention.

DESCRIPTION OF PREFERRED EMBODIMENTS

Referring now to the drawings, and particularly to FIGS. 1 and 2, one form of improved hydraulic vibrator of the present invention is illustrated and generally designated by the numeral 10. The apparatus 10 basically comprises a frame 12 having a fixed double rod piston member 14 attached thereto and a reaction mass 16 reciprocally mounted around the piston member 14.

The frame 12 can take various forms, but generally includes a base plate 18 and an upper frame member 20 connected together by an enclosure 22. The double rod piston member 14 includes a lower rod 24, the end of which is connected to the base plate 18, an upper rod 26, the end of which is connected to the upper frame member 20, and a centrally disposed double-acting drive piston 28. The drive piston 28 is slidably received within a hydraulic drive cylinder 30 formed within the reaction mass 16. The drive piston 28 can be of any suitable conventional construction and can be provided with piston rings 32 or the like to insure a sliding, fluid-tight seal within the interior of the drive cylinder 30. The drive cylinder 30 can be formed within the reaction mass 16 by a plurality of sleeve inserts and sealing rings (not shown) in a conventional manner.

As will be understood by those skilled in the art, pressurized hydraulic fluid is successively introduced to the drive cylinder 30 on opposite sides of the drive piston 28 by way of hydraulic fluid ports 34 and 36 disposed on opposite sides of the drive piston 28. The ports 34 and 36 are formed in the rods 24 and 26, respectively, and are connected to a pair of passageways 38 and 40 extending upwardly through the piston member 14. That is, the hydraulic fluid port or ports 34 are connected to the passageway 38 and the hydraulic fluid port or ports 36 are connected to the passageway 40. The passageways 38 and 40 are in turn connected to a pair of complementary passageways 42 and 44 disposed in the upper frame member 20 and to a conventional hydraulic fluid drive control system 50 by a pair of conduits 46 and 48. The hydraulic drive control system 50 can take various forms, but generally includes a control valve or servo-mechanism activated by a suitable electric control system to cause pressurized hydraulic fluid to alternately pass to and from the cylinder 30 by way of the hydraulic fluid ports 34 and 36 and passageways 38 and 40 which in turn causes the reaction mass 16 to be reciprocated.

As mentioned above, in order for the hydraulic vibrator 10 to produce vibrations in the low frequency range, the displacement of the drive cylinder 30 must be relatively large and relatively large volumes of pressurized hydraulic fluid are passed to and from the hydraulic drive cylinder 30. By the present invention, and in order to allow the displacement of the drive cylinder 30 to be selectively changed, a pair of sleeves 52 and 54 are slidably disposed on the piston member 14 adjacent the drive piston 28. That is, the sleeve 52 is slidably disposed on the rod 26 of the piston member 14 and the sleeve 54 is slidably disposed on the rod 24. The sleeves 52 and 54 include cylindrical portions of reduced diameter 56 and 58, respectively, at the inner ends thereof adjacent the drive piston 28, and cylindrical portions of enlarged diameter 60 and 62, respectively, at the outer ends thereof. As best shown in FIG. 2, the enlarged portions 60 and 62 of the sleeves 52 and 54 form oppositely facing annular surfaces on the sleeves 52 and 54. That is, the sleeve 52 includes oppositely facing annular surfaces 64 and 66, and the sleeve 54 includes oppositely facing annular surfaces 68 and 70.

The portions 56 and 58 of the sleeves 52 and 54 are of a size such that they readily fit within the drive cylinder 30 formed within the reaction mass 16. The reaction mass 16 also includes a pair of enlarged cylindrical recesses 72 and 74 disposed therein and positioned at opposite ends of the drive cylinder 30 for containing the enlarged cylindrical portions 60 and 62 of the sleeves 52 and 54. The enlarged cylindrical portions 60 and 62 of the sleeves 52 and 54 and the recesses 72 and 74 are sized such that the enlarged portions 60 and 62 are free to move longitudinally within the recesses 72 and 74. Each of the recesses 72 and 74 terminates in inner and outer annular surfaces for coacting with the inner and outer annular surfaces of the enlarged portions 60 and 62 of the sleeves 52 and 54. That is, the recess 72 includes annular surfaces 76 and 78 for coacting with the annular surfaces 64 and 66 of the sleeve 52, and the recess 74 includes annular surfaces 80 and 82 for coacting with the annular surfaces 68 and 70 of the sleeve 54.

The longitudinal lengths of the recesses 72 and 74 are such that when the outer annular surfaces 64 and 68 of the sleeves 52 and 54 are in contact with the outer annular surfaces 76 and 80 of the recesses 72 and 74, the reduced diameter portions 56 and 58 of the sleeves 52 and 54 lie substantially outside the drive cylinder 30 as shown in FIG. 1. When the inner annular surfaces 66 and 70 of the sleeves 52 and 54 are in contact with the inner annular surface 66 and 70 of the recesses 72 and 74 as illustrated in FIG. 2, the reduced diameter portions 56 and 58 of the sleeves 52 and 54 extend within the confines of the drive cylinder 30 thereby reducing the displacement of the drive cylinder 30.

As illustrated in FIGS. 1 and 2, conventional piston rings or equivalent slidable seal means 84 and 86 are disposed in annular grooves provided in the enlarged cylindrical portions of the sleeves 52 and 54 so that slidable seals are provided between the enlarged portions of the sleeves 52 and 54 and the peripheral surfaces of the recesses 72 and 74. Conventional piston rings or equivalent slidable seal means 85 and 87 are disposed in annular grooves provided in the reduced diameter portions 56 and 58 of the sleeves 52 and 54 adjacent the inner ends thereof so that seals are provided between the reduced diameter portions 56 and 58 and the peripheral surfaces of the drive cylinder 30. In addition, the recesses 72 and 74 include hydraulic fluid ports 88 and 90, respectively, positioned adjacent the inner annular surfaces 78 and 82 thereof. The ports 88 and 90 are connected to passageways 92 and 94 which are in turn connected to a passageway 96 formed in the reaction mass 16. Ports 98 and 100 are provided in the recesses 72 and 74, respectively, positioned adjacent the annular surfaces 76 and 80 thereof which are connected to passageways 102 and 104, respectively. The passageways 102 and 104 are in turn connected to a passageway 106 formed in the reaction mass 16.

As shown in FIG. 1, the hydraulic fluid passageways 96 and 106 are connected to hoses 108 and 110 which are in turn connected to passageways 112 and 114 disposed in the frame member 20. A pair of conduits or hoses 116 and 118 are connected to the passageways 112 and 114 and to a conventional hydraulic fluid control valve 120. When in the position shown, the control valve 120 connects the conduit or hose 116 to a source of pressurized hydraulic fluid 122 by way of a conduit 124, and connects the conduit or hose 118 to a hydraulic fluid reservoir by way of a conduit 126. As will be understood, when the position of the control valve 120 is changed, the conduit 116 is connected to the reservoir and the conduit 118 is connected to the source of pressurized hydraulic fluid 122.

In operation of the apparatus 10, pressurized hydraulic fluid is successively introduced to the drive cylinder 30 on opposite sides of the drive piston 28 thereby causing the reaction mass 16 to reciprocate relative to the base plate 18. When the apparatus 10 is operated in a manner to produce low frequency vibrations, pressurized hydraulic fluid is conducted from the source 122 thereof by way of the conduit 124 through the valve 120, the conduit or hose 116, the passageway 112 in the frame member 20, the hose 108, the passageway 96, the passageways 92 and 94, the ports 88 and 90 into the recesses 72 and 74 which causes the sleeves 52 and 54 to be moved outwardly whereby the annular surfaces 64 and 68 of the sleeves 52 and 54 are in contact with the annular surfaces 76 and 80 of the recesses 72 and 74, and the reduced diameter portions 56 and 58 of the sleeves 52 and 54 lie substantially outside the drive cylinder 30 as shown in FIG. 1. When the vibrator 10 is operated at high frequencies, the position of the valve 120 is reversed so that pressurized hydraulic fluid is conducted by way of the conduit 118, the passageway 114 in the frame member 20, the hose 110, the passageway 106, the passageways 102 and 104 and the ports 98 and 100 into the recesses 72 and 74. This, in turn, moves the sleeves 52 and 54 to the position shown in FIG. 2 whereby the annular surfaces 66 and 70 of the sleeves 52 and 54 are contacted by the annular surfaces 78 and 82 of the recesses 72 and 74, and the reduced portions 56 and 58 of the sleeves 52 and 54 are extended within the drive cylinder 30 thereby reducing the displacement of the drive cylinder 30. As will be understood, the reduction in displacement of the drive cylinder 30 allows the vibrator 10 to operate at high frequencies in that less hydraulic fluid is in compression in the drive cylinder 30.

As will be understood by those skilled in the art, the inner ports 88 and 90 in the recesses 72 and 74, respectively, the passageways 92, 94 and 96 and the hoses, etc., relating thereto, as well as the piston rings 85 and 87 are not essential to the operation of the vibrator 10 since the introduction of pressurized hydraulic fluid to the recesses 72 and 74 by way of the ports 98 and 100 will move the sleeves 52 and 54 inwardly to the position illustrated in FIG. 2, and when such pressurized hydraulic fluid is allowed to flow to the reservoir by changing the position of the control valve 120, the presence of pressurized hydraulic fluid in the drive cylinder 30 will cause the sleeves 52 and 54 to move outwardly to the position shown in FIG. 1. However, the utilization of the ports 88 and 90 and associated passageways and conduits as well as the piston rings 85 and 87 is preferred in that more positive control of the movement of the sleeves 52 and 54 is achieved.

In order to insure that the sleeves 52 and 54 remain in the desired position during operation of the vibrator 10, i.e., are not moved by the pressurized hydraulic fluid introduced to the drive cylinder 30, the inner and outer annular surfaces 64, 66, 68 and 70 of the sleeves 52 and 54 are sized such that they each contain a quantity of surface area as compared to either side of the drive piston 28 such that the resultant hydraulic force exerted on the sleeves 52 and 54 is always greater than the force exerted on the drive piston 28. Thus, even though the hydraulic fluid pressure exerted within the drive cylinder 30 is greater than the hydraulic fluid pressure exerted on the sleeves 52 and 54, the sleeves 52 and 54 will not be moved from their selected position.

Referring now to FIG. 3, an alternate form of hydraulic vibrator including the present invention is illustrated. In the vibrator 10 illustrated in FIGS. 1 and 2, the hydraulic ports 34 and 36 for introducing pressurized hydraulic fluid into the drive cylinder 30 and the passageways associated therewith are disposed in the piston member 14. Other hydraulic vibrators which operate similarly include ports and passageways for introducing pressurized hydraulic fluid into the drive cylinder which are disposed in the reaction mass 16. Such an arrangement is illustrated in FIG. 3, i.e., the ports 34 and 36 are disposed in the reaction mass 16 as are the passageways 38 and 40 connected thereto. In accordance with the present invention, the vibrator illustrated in FIG. 3 includes sleeves 52 and 54, recesses 72 and 74, ports 88, 90, 98 and 100, passageways 92, 94, 102 and 104 and passageways 96 and 106 identical to those described above in connection with the vibrator 10. In addition, the operation of the vibrator illustrated in FIG. 3 is identical to the operation of the vibrator 10. The only difference in the vibrator of FIG. 3, other than the different porting arrangement for the cylinder 30, is that the drive cylinder 30 and the reduced diameter portions of the sleeves 52 and 54 are longer than those illustrated in FIGS. 1 and 2 in order to accommodate the distance required between the ports 34 and 36 disposed in the reaction mass 16.

Thus, the present invention is well adapted to carry out the objects and attain the ends and advantages mentioned as well as those inherent therein. While presently preferred embodiments of the invention have been described for the purpose of this disclosure, numerous changes in the details of construction and arrangement of parts can be made by those skilled in the art which are encompassed within the spirit of this invention and the scope of the appended claims.

What is claimed is:

1. In a hydraulic vibrator having a piston member comprised of a pair of oppositely extending rods connected to a centrally disposed drive piston and a reaction mass reciprocally disposed around the piston member forming a hydraulic drive cylinder therein so that when hydraulic fluid is introduced to the drive cylinder relative to the drive piston the reaction mass is reciprocated, the improvement comprising:

a sleeve slidably disposed on each of the rods, each of said sleeves including a cylindrical portion of reduced diameter at the inner end thereof adjacent the drive piston and a cylindrical portion of enlarged diamter at the outer end thereof forming inner and outer oppositely facing annular surfaces on said sleeve;

the reaction mass including a pair of enlarged cylindrical recesses positioned at opposite ends of the drive cylinder for containing said enlarged cylindrical portions of said sleeves, each of said recesses terminating in inner and outer annular surfaces for coacting with said inner and outer annular surfaces of said enlarged portions of said sleeves and confining the longitudinal movement of said sleeves, the longitudinal lengths of said recesses being such that when said outer annular surfaces of said enlarged portions of said sleeves are in contact with said outer annular surfaces of said recesses, the reduced diameter portions of said sleeves lie substantially outside the drive cylinder and when said inner annular surfaces of said enlarged portions of said sleeves contact said inner annular surfaces of said recesses, said reduced diameter portions of said sleeves are extended within the drive cylinder thereby reducing the displacement of the drive cylinder;

slidable seal means attached to said enlarged portions of each of said sleeves for providing seals between said enlarged portions of said sleeves and the peripheral surfaces of said recesses; and means including ports for introducing hydraulic fluid into said recesses on selected sides of said slidable seal means connected to said recesses and to a source of pressurized hydraulic fluid whereby said sleeves can be simultaneously selectively moved between positions whereby said portions of reduced diameter thereof lie substantially outside the drive cylinder and positions whereby said portions of reduced diameter extend within the drive cylinder thereby reducing the displacement thereof.

2. The apparatus of claim 1 which is further characterized to include second slidable seal means attached to said portions of reduced diameter of each of said sleeves for providing seals between said portions of reduced diameter and the peripheral surfaces of the drive cylinder.

3. The apparatus of claim 2 wherein said slidable seal means are each comprised of one or more piston rings disposed in annular grooves formed in peripheral surfaces of said sleeves.

4. The apparatus of claim 2 wherein said inner and outer annular surfaces of each of said enlarged portions of said sleeves are each of a size such that a greater hydraulic force is exerted on said sleeves than on the sides of said drive piston.

5. An improved hydraulic vibrator which comprises:
a frame;
a vertical double rod piston member having a centrally disposed drive piston and upper and lower rods attached thereto and to said frame;
a sleeve slidably disposed on each of said upper and lower rods, each of said sleeves including a cylindrical portion of reduced diameter at the end thereof adjacent said drive piston and a cylindrical portion of enlarged diameter at the other end thereof forming oppositely facing annular surfaces on said sleeves;
a reaction mass reciprocally disposed around said piston member forming a hydraulic drive cylinder around said centrally disposed drive piston and said portions of reduced diameter of said sleeves and forming enlarged cylindrical recesses at opposite ends of said drive cylinder for containing said enlarged cylindrical portions of said sleeves, each of said recesses terminating in oppositely facing annular surfaces for coacting with said annular surfaces of said enlarged portions of said sleeves and confining the longitudinal movement of said sleeves, the longitudinal lengths of said recesses being such that when said enlarged portions of said sleeves are moved within said recesses to positions furthermost away from said drive piston, the reduced diameter portions of said sleeves lie substantially outside said drive cylinder and when said enlarged portions of said sleeves are moved within said recesses to the innermost positions therein, said reduced diameter portions of said sleeves are extended within said drive cylinder thereby reducing the displacement of said drive cylinder;
slidable seal means attached to said enlarged portions of each of said sleeves for providing seals between said enlarged portions of said sleeves and the peripheral surfaces of said recesses;
means including ports for introducing hydraulic fluid to said drive cylinder to reciprocate the reaction mass relative to said drive piston connected to said drive cylinder and to a source of pressurized hydraulic fluid; and
means including ports for introducing hydraulic fluid into said recesses on selected sides of said slidable seal means connected to said recesses and to a source of pressurized hydraulic fluid so that said sleeves can be selectively simultaneously moved between positions whereby said portions of reduced diameter thereof lie substantially outside said drive cylinder and positions whereby said portions of reduced diameter extend within said drive cylinder thereby reducing the displacement thereof.

6. The apparatus of claim 5 which is further characterized to include second slidable seal means attached to said portions of reduced diameter of each of said sleeves for providing seals between said portions of reduced diameter and the peripheral surfaces of said drive cylinder.

7. The apparatus of claim 6 wherein said slidable seal means are each comprised of one or more piston rings disposed in annular grooves formed in peripheral surfaces of said sleeves.

8. The apparatus of claim 6 wherein said annular surfaces of each of said enlarged portions of said sleeves are each of a size such that a greater hydraulic force is exerted on said sleeves than on the sides of said drive piston.

* * * * *